US010331448B2

United States Patent
Son et al.

(10) Patent No.: US 10,331,448 B2
(45) Date of Patent: Jun. 25, 2019

(54) GRAPHICS PROCESSING APPARATUS AND METHOD OF PROCESSING TEXTURE IN GRAPHICS PIPELINE

(71) Applicant: SAMSUNG ELECTRONICS CO., LTD., Suwon-si, Gyeonggi-Do (KR)

(72) Inventors: Min-Young Son, Hwaseong-si (KR); Kwon-Taek Kwon, Hwaseong-si (KR); Jae-Don Lee, Yongin-si (KR); Min-Kyu Jeong, Yongin-si (KR); Sang-Won Ha, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/628,085

(22) Filed: Jun. 20, 2017

(65) Prior Publication Data

US 2018/0150296 A1    May 31, 2018

(30) Foreign Application Priority Data

Nov. 28, 2016    (KR) .................. 10-2016-0159419

(51) Int. Cl.
*G06T 15/00*    (2011.01)
*G06F 9/30*    (2018.01)
(Continued)

(52) U.S. Cl.
CPC ............ *G06F 9/30079* (2013.01); *G06T 1/20* (2013.01); *G06T 15/04* (2013.01); *G06T 2210/36* (2013.01)

(58) Field of Classification Search
CPC . G06F 9/30079; G06T 2210/36; G06T 15/04; G06T 1/20
(Continued)

(56) References Cited

U.S. PATENT DOCUMENTS 6,313,846 B1 *  11/2001  Fenney ................... G06T 15/04
                                                         345/552
6,906,715 B1 *   6/2005  Dunn ..................... G06T 15/405
                                                         345/421
(Continued)

FOREIGN PATENT DOCUMENTS

JP           2010-033299           2/2010
KR      10-2014-0099308            8/2014
(Continued)

OTHER PUBLICATIONS

Taibo, J., Seoane, A. and Hernández, L., 2009. Dynamic virtual textures.*

*Primary Examiner* — Phu K Nguyen
(74) *Attorney, Agent, or Firm* — F. Chau & Associates, LLC

(57) ABSTRACT

A method and a graphics processing apparatus for processing texture in a graphics pipeline determine a rendering level of a dynamic texture based on usage information of a target object and render the target object by texturing the target object with the dynamic texture rendered based on the rendering level. The graphics processing apparatus includes at least one cache memory, and at least one processor configured to: perform geometry processing of a dynamic texture to be mapped onto a target object, determine a rendering level of the dynamic texture based on usage information of the target object obtained by the geometry processing of the target object, render the dynamic texture based on the determined rendering level, and render the target object by texturing the target object with the rendered dynamic texture.

17 Claims, 13 Drawing Sheets

(51) Int. Cl.
  *G06T 1/20*     (2006.01)
  *G06T 15/04*    (2011.01)
(58) Field of Classification Search
  USPC .......................................................... 345/419
  See application file for complete search history.

(56) References Cited

U.S. PATENT DOCUMENTS

| | | | |
|---|---|---|---|
| 7,768,521 B2 * | 8/2010 | Fuchie | G06T 1/60 |
| | | | 345/536 |
| 7,999,819 B2 * | 8/2011 | Liao | G06T 15/04 |
| | | | 345/538 |
| 8,189,007 B2 * | 5/2012 | Kim | G06T 11/40 |
| | | | 345/426 |
| 8,203,564 B2 * | 6/2012 | Jiao | G06T 15/005 |
| | | | 345/421 |
| 8,593,475 B2 | 11/2013 | Smithers et al. | |
| 8,888,590 B2 | 11/2014 | Kruglick | |
| 9,232,177 B2 | 1/2016 | Venkatasubramanian | |
| 9,563,932 B2 * | 2/2017 | Wang | G06T 1/60 |
| 9,576,396 B2 * | 2/2017 | Park | G06T 15/005 |
| 2010/0220104 A1 | 9/2010 | Tanaka | |
| 2015/0049107 A1 | 2/2015 | Park | |

FOREIGN PATENT DOCUMENTS

| | | |
|---|---|---|
| KR | 10-2015-0005799 | 1/2015 |
| KR | 10-2015-0019358 | 2/2015 |
| WO | 2009/034634 | 3/2009 |

\* cited by examiner

GRAPHICS PROCESSING APPARATUS AND METHOD OF PROCESSING TEXTURE IN GRAPHICS PIPELINE

CROSS-REFERENCE TO RELATED APPLICATION

This application claims the benefit of Korean Patent Application No. 10-2016-0159419, filed on Nov. 28, 2016, in the Korean Intellectual Property Office, the disclosure of which is incorporated by reference herein.

1. TECHNICAL FIELD

The present disclosure relates to a graphics processing apparatus and a method of processing texture in a graphics pipeline.

2. DISCUSSION OF THE RELATED ART

In a three-dimensional (3D) graphic system, a texturing or texture mapping technology is being used to obtain a more realistic image. Texturing or texture mapping refers to the wrapping of a two-dimensional (2D) image on a surface of a 3D object to give texture to the surface of the 3D object. The texturing may be an important design factor in the performance of 3D rendering and may utilize relatively large amounts of power by a processor. Since texturing operations often include accessing a memory, there may be an impact on bandwidth and power consumption associated with memory operations, and delays in accessing a memory may result. In addition, memory access in the performance of texturing operations may be a major cause of bottleneck between the processor and a memory. Accordingly, it would be desirable to reduce throughput for the texturing in terms of efficient performance of a graphics processing unit (GPU).

SUMMARY

The inventive concept provides a graphics processing apparatus and a method of processing texture in a graphics pipeline.

Additional teachings of the inventive concept will be set forth in part in the description which follows and, in part, will be understood by a person of ordinary skill in the art from the description, and/or by practice of the presented embodiments.

According to an embodiment of the inventive concept, a method of processing texture in a graphics pipeline includes performing geometry processing of a dynamic texture to be mapped onto a target object, determining a rendering level of the dynamic texture based on usage information of the target object that is obtained by performing geometry processing of the target object, rendering the dynamic texture based on the determined rendering level, and rendering the target object by texturing the target object with the rendered dynamic texture.

According to an embodiment of the inventive concept, a non-transitory computer-readable recording medium recorded with a program for executing the method in a computer is provided.

According to an embodiment of the inventive concept, a graphics processing apparatus that processes texture in a graphics pipeline includes at least one cache memory, and at least one processor, wherein the at least one processor performs geometry processing of a dynamic texture to be mapped onto a target object, determining a rendering level of a dynamic texture to be mapped onto a target object based on usage information of the target object that is by the geometry processing; rendering the dynamic texture when the determined rendering level indicates that rendering the dynamic texture is to be performed; and rendering the target object by texturing the target object with the rendered dynamic texture.

BRIEF DESCRIPTION OF THE DRAWINGS

The inventive concept will be more readily appreciated by a person of ordinary skill in the art from the following description of the exemplary embodiments, taken in conjunction with the accompanying drawings in which.

DETAILED DESCRIPTION

Figure 1:
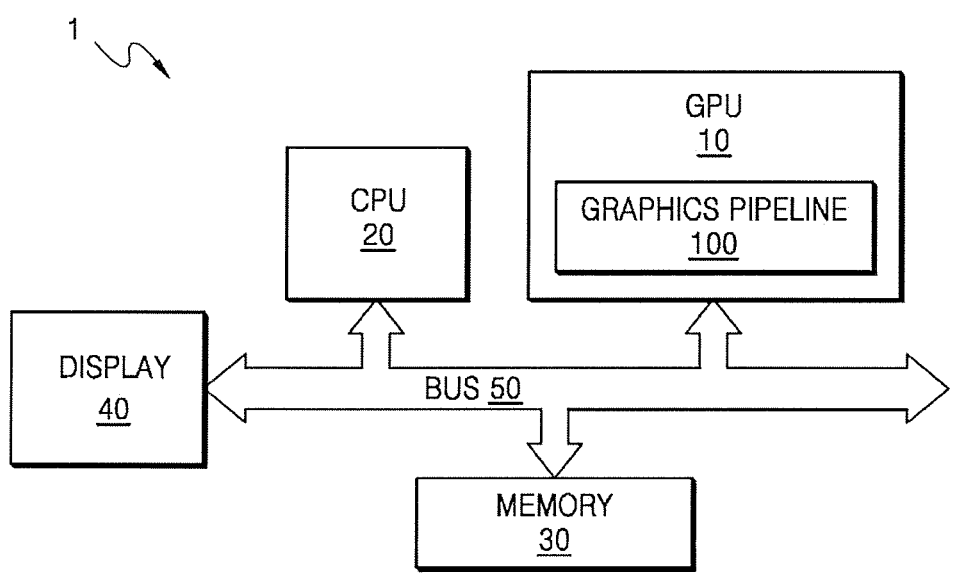
FIG. 1 is a diagram illustrating a computing device according to an embodiment of the inventive concept.

Reference will now be made in detail to at least one embodiment of the inventive concept, examples of which are illustrated in the accompanying drawings, wherein like reference numerals refer to like elements throughout. In this regard, the inventive concept may have different forms and should not be construed as being limited to the descriptions set forth herein. Accordingly, the embodiments are provided herein below, with reference to the figures, for illustrative purposes. Expressions such as "at least one of", when preceding a list of elements, modify the entire list of elements and do not modify the individual elements of the list.

FIG. 1 is a drawing illustrating a computing device according to an embodiment of the present disclosure.

Referring to FIG. 1, a computing device 1 includes a graphics processing unit (GPU) 10, a central processing unit (CPU) 20, a memory 30, a display 40, and a bus 50. Only components of the computing device 1 associated with an explanation of the inventive concept are illustrated in FIG. 1. Accordingly, it should be understood and appreciated by a person of ordinary skill in the art that the computing device 1 may further include general-purpose components in addition to the components illustrated in FIG. 1.

The computing device 1 may be, but is not limited thereto, a desktop computer, a notebook computer, a smartphone, a personal digital assistant (PDA), a portable media player, a video game console, a television set-top box, a tablet device, an e-book reader, a wearable device, a head mounted display (HMD) device, etc. For example, the computing device 1 may be a device that has a graphics processing function for displaying content, and a category of the computing device 1 may include various devices.

The CPU 20 includes hardware, such as integrated circuits, that may be configured to control operations and functions of the computing device 1. For example, the CPU 20 may drive an operating system (OS), may call a graphics application programming interface (API) for the GPU 10, and may execute a driver of the GPU 10. Also, the CPU 20 may execute various applications stored in the memory 30, such as a web browsing application, a game application, and a videos application.

The GPU 10 is a graphics processing apparatus may execute a graphics pipeline 100 that may perform one or more function(s) of a graphics dedicated processor. For example, the GPU 10 may be constructed of hardware that is configured to execute a 3D graphics pipeline to render 3D objects on a 3D image to a 2D image for display. For example, the GPU 10 may perform functions such as shading, blending, and illuminating and functions for generating pixel values of pixels to be displayed.

The graphics pipeline 100 that the GPU 10 processes may comprise a graphics pipeline for tile-based rendering (TBR) or a graphics pipeline for immediate rendering (IMR). Moreover, the graphics pipeline 100 that the GPU 10 performs may be a graphics pipeline for deferred rendering.

With continued reference to FIG. 1, the graphics pipeline 100 that is processed by the GPU 10 may be similar to a type of graphics pipeline that is defined by a graphics API such as various versions of DirectX and an OpenGL API. For example, the graphics pipeline 100 according to an embodiment of the inventive concept may be applied to various APIs without being limited to any one API version or any one API type.

The memory 30 includes hardware to store various kinds of data processed in the computing device 1. The memory may store pieces of data processed or to be processed in the GPU 10 and the CPU 20. Also, the memory 30 may store applications, drivers, etc. to be driven by the GPU 10 and the CPU 20. The memory 30 may include but is not limited to types such as a random access memory, (e.g. dynamic random access memory (DRAM) or static random access memory (SRAM)), a read-only memory (ROM), an electrically erasable programmable ROM (EEPROM), a CD-ROM, a blue ray or any other optical disk storage, a hard disk drive (HDD), a solid state drive (SSD), or a flash memory. In addition, the memory 30 may include another external storage device that is accessible by the computing device 1.

The display 40 includes hardware that displays an image processed by the GPU 10. For example, the display 40 may display an image rendered by the GPU 10. The display 40 may include screen pixels of a resolution, and the GPU 10 renders an image of the resolution. The display 40 may be implemented with various kinds of display panels, included but not limited to a liquid crystal display (LCD) panel and an organic light-emitting diode (OLED) panel.

The bus 50 may include hardware that interconnects various pieces of hardware to allow the exchange of data. For example, the bus 50 may include various kinds of buses, such as a peripheral component interconnect (PCI) bus and a PCI express bus.

The computing device 1, in particular, the GPU 10, may not render a dynamic texture to be textured on a target object so as to be the same as a dynamic image. For example, the dynamic texture to be textured on the target object may be rendered according to a state of the target object on a current frame, so as to be lower in quality than an original dynamic image, or to correspond to a portion of the original dynamic image. In addition, in the case where the target object is not displayed on the current frame, the dynamic texture may not be rendered. As such, throughput that is used to render the dynamic texture may be adjusted by adjusting a rendering level of the dynamic texture based on the state of the target object. This may result in the throughput for texturing also being adjusted.

Figure 2:
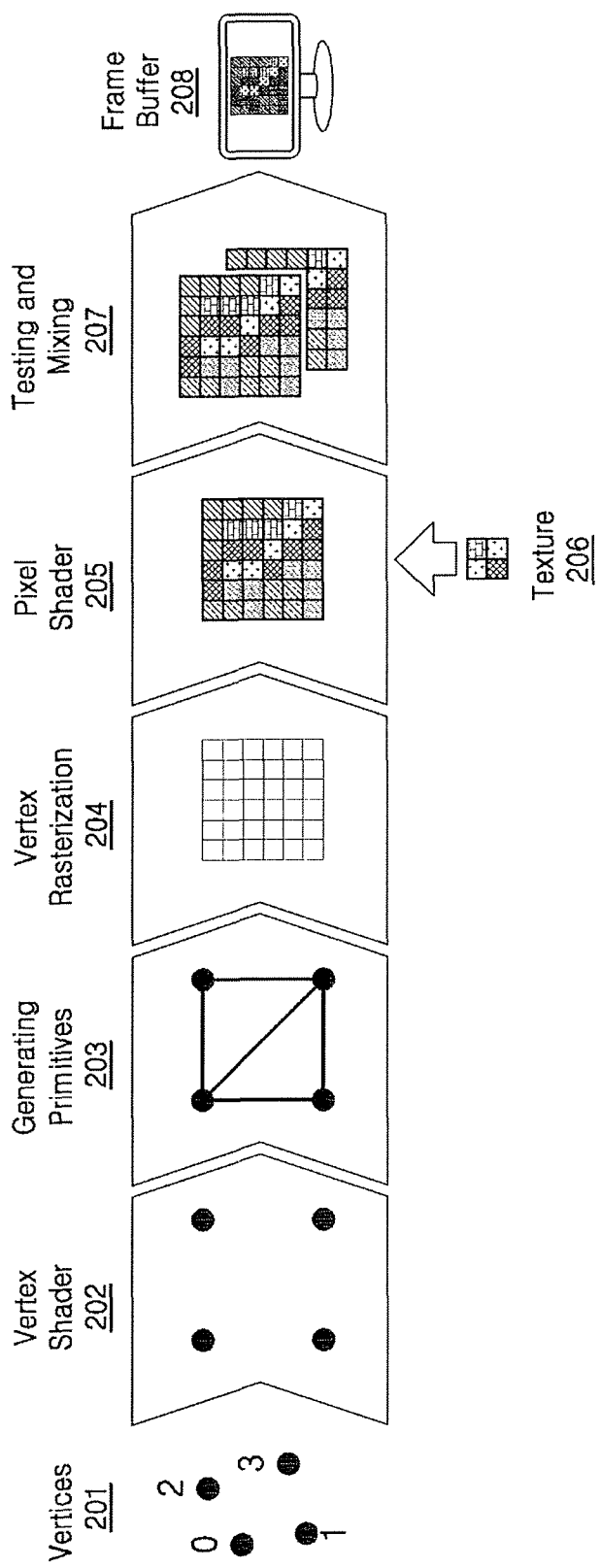
FIG. 2 is a diagram illustrating a graphics pipeline processed by a graphic processing unit (GPU) according to an embodiment of the inventive concept.

FIG. 2 is a drawing illustrating a graphics pipeline processed by a GPU according to an embodiment of the inventive concept.

Referring to FIG. 2, the whole process of the graphics pipeline 100 (e.g. such as shown in FIG. 1) may be divided into geometry processing, rasterization, and pixel shading.

Operation 201 is performed to generate vertices. The vertices are created to indicate objects included in 3D graphics.

Operation 202 is performed for vertex shading on the created vertices in operation 201. For example, a vertex shader may perform the vertex shading by defining locations of the vertices created in operation 201.

Operation 203 is performed to generate primitives based on the generated vertices. A primitive refers to a dot, a line, a polygon, etc. formed by using one or more vertices. For example, the primitive may be a triangle of which three vertices are connected to each other.

Operation 204 is performed to rasterize the primitive generated in operation 203. The rasterization of the primitive refers to division of the primitive into fragments. The fragment may be a basic unit for performing graphics processing on the primitive. Since the primitive includes only information about a vertex, 3D graphics processing may be performed by generating fragments between a vertex and a vertex through rasterizing.

Operation 205 is performed to shade pixels. The fragments that are created by the rasterizing and constitute the primitive may correspond to pixels on a screen space. In this specification, the terms "fragment" and "pixel" may be interchangeably used. For example, a pixel shader may be referred to as a "fragment shader". In general, a basic unit of graphics processing, which forms the primitive, may be referred to as a "fragment", and then, a basic unit of graphics processing, which will be performed by pixel shading, may be referred to as a "pixel". Values of pixels, attributes (e.g., a color of a pixel), etc. may be determined by the pixel shading.

Operation 206 is a texturing operation performed to determine a pixel color. Texturing may refer to a process of determining colors of pixels by using textures that are prepared in advance. For example, to express various colors and patterns by using pixels, colors of all pixels may be calculated and determined. The GPU 10 may determine colors of pixels by using the textures that are prepared in advance. To this end, textures of different resolutions may be defined in advance and prepared to adaptively correspond to the size of an object to be drawn in any quantity of pixels at various resolutions. Textures that have different resolutions and are defined in advance are referred to as "mipmap".

Operation 207 is performed for testing and mixing. Pixel values to be finally displayed may be determined through a depth test, curling, clipping, etc.

Operation 208 is performed to store a frame, which is generated through operation 201 to operation 207, in a frame buffer and/or to display the frame stored in the frame buffer on the display 40 of FIG. 1.

The general concept of the graphics pipeline 100 discussed with reference to FIG. 2, and more detailed processes of the graphics pipeline are well-known in this art.

Figure 3:
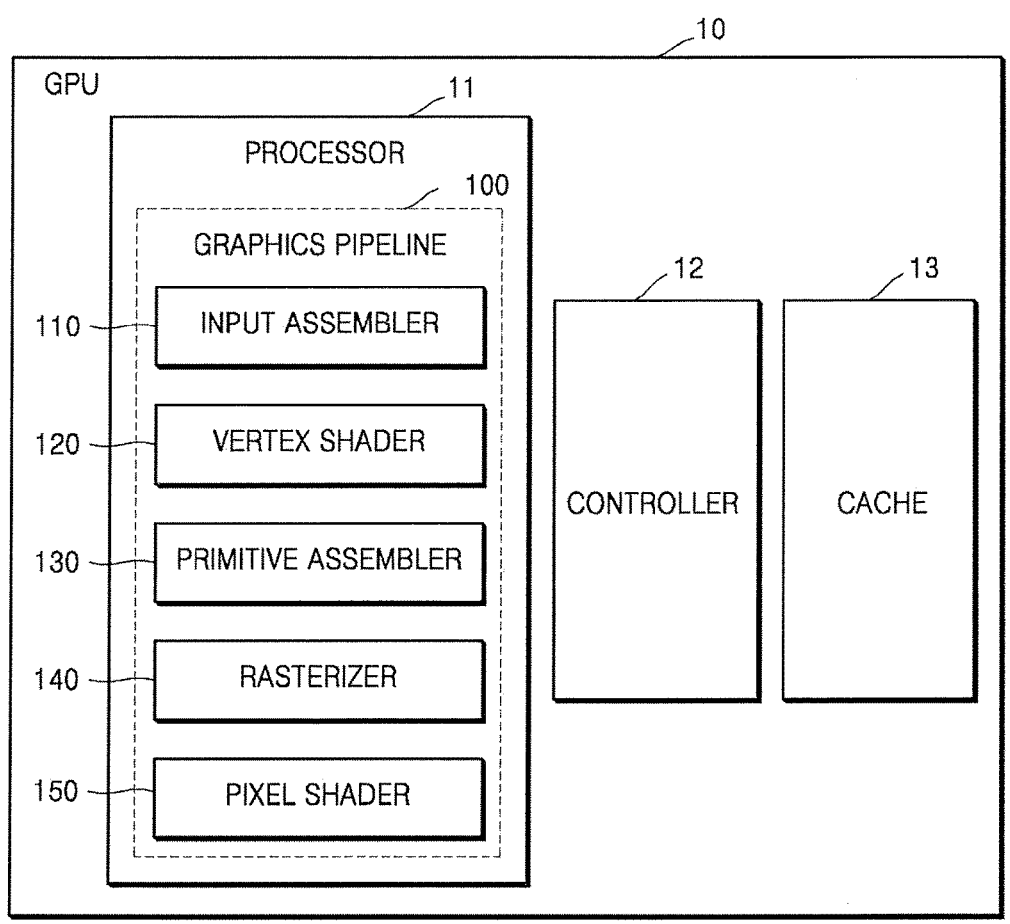
FIG. 3 is a block diagram illustrating a detailed hardware structure of the GPU according to an embodiment of the inventive concept.

FIG. 3 is a block diagram illustrating a detailed hardware structure of a GPU, according to an embodiment of the inventive concept.

Referring to FIG. 3, the GPU 10 may include, for example, at least one processor 11 to perform the graphics pipeline 100, a controller 12, and at least one cache 13 (cache memory). The processor 11 may include an input assembler 110, a vertex shader 120, a primitive assembler 130, a rasterizer 140, and a pixel shader 150. These items may be realized, for example, a part of an integrated circuit(s) configured for operation. The at least one processor may have machine executable code loaded therein.

Meanwhile, the above-described components that perform the graphics pipeline in the processor 11 may be classified, for example, based on functions that will be described later. Accordingly, the components that perform the graphics pipeline 100 may be respectively implemented with program logic or software modules that execute the functions to be described later. Unlike the above description, the components that perform the graphics pipeline 100 may be respectively implemented with sub-processing units (or processor cores) provided in the processor 11. For example, implementation of the components that perform the graphics pipeline 100 is not limited to any one processor core. The names of components that perform the graphics pipeline in the GPU 100 may be provided for ease of description, or based on functionality. Thus, the name of the components may change with a kind, a version, etc. of a graphics API. For example, the components that perform the graphics pipeline 100 in the processor 11 may variously correspond to names of components that are defined in various kinds of APIs such as DirectX, CUDA, and OpenGL.

With continued reference to FIG. 3, the input assembler 110 provides the graphics pipeline 100 with data of vertices associated with objects stored in the memory 30 of FIG. 1, based on input drawcalls. The vertices provided to the graphics pipeline 100 may refer to, but are not limited thereto, a patch that is an expression of a mesh or surface. The drawcall is a command indicating whether to render any object at any frame. For example, the drawcall may be a command for drawing primitives, such as triangles or quadrangles, at an image or frame.

The vertex shader 120 determines coordinates of each vertex on a 3D space by using information regarding locations of vertices included in a frame, attributes of the vertices, etc.

The primitive assembler 130 converts vertices into primitives.

The rasterizer 140 performs rasterizing for converting primitives into pixel values in a 2D space.

The pixel shader 150 creates a fragment that refers to pixels covered by a primitive and determines a depth value, a stencil value, a color value, etc. of the fragment. The pixel shader 150 may include a texture unit that performs processes associated with texturing and may perform texturing of an object. A pixel shading result of the pixel shader 150 may be displayed as a frame of a video after being stored in the cache 13 (e.g., a frame buffer).

The controller 12 controls the functions and operations of the components 110 to 150 of the graphics pipeline 100 and the cache 13. The controller may include, for example, hardware and machine executable code loaded for operation.

The cache 13 may store results, which are processed while the graphics pipeline 100 is performed, for example, textures and frames. The cache 13 may provide the processor 11 with data used to perform the graphics pipeline 100, for example, vertex data, primitive data, and texture data.

Figure 4A:
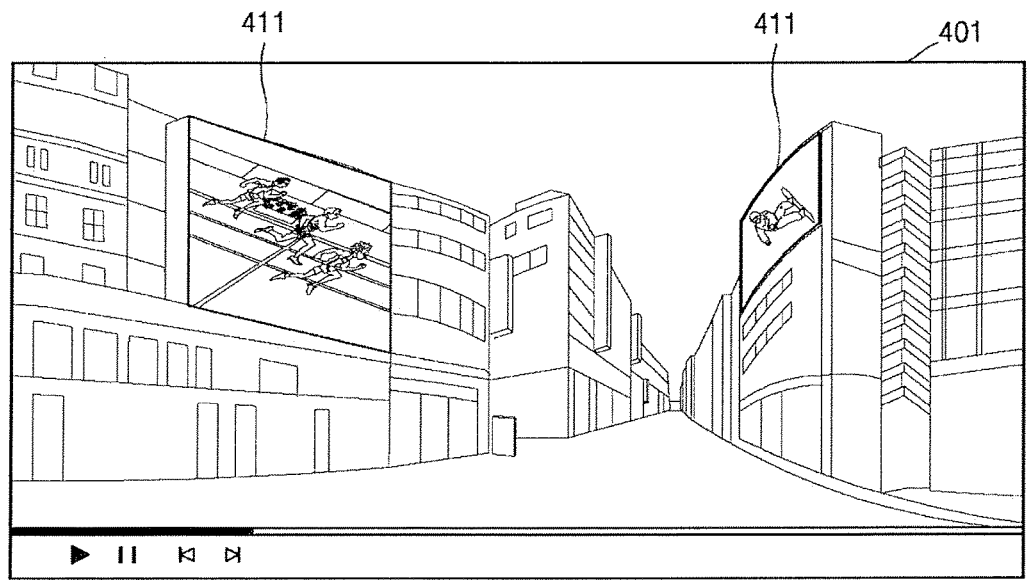
FIGS. 4A and 4B are images illustrating dynamic texturing according to an embodiment of the inventive concept.
Figure 4B:
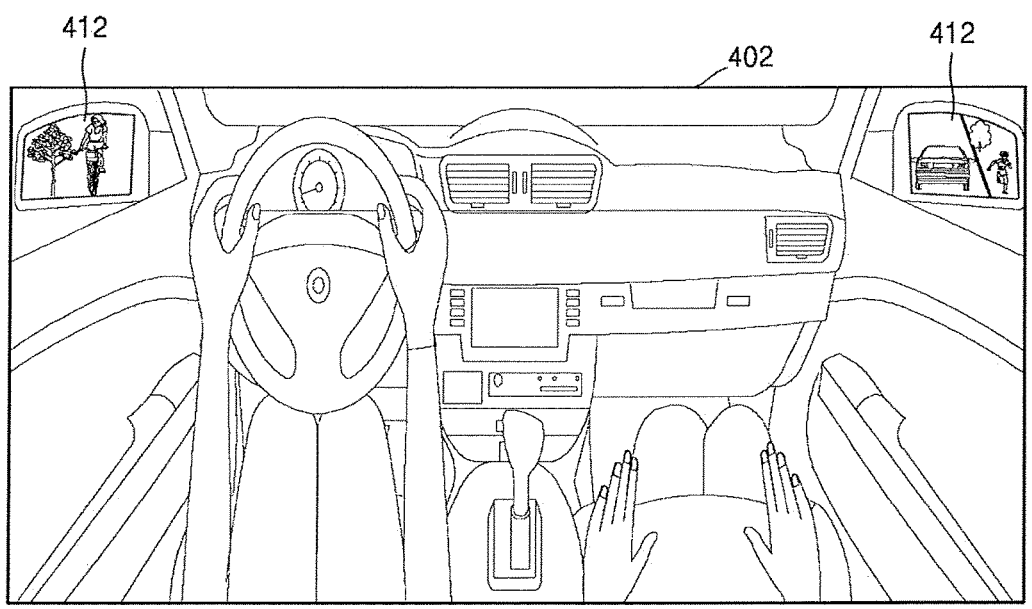

FIGS. 4A and 4B are images illustrating dynamic texturing according to an embodiment of the inventive concept.

Referring to FIG. 4A, a dynamic texture refers to a dynamic image rendered in real time is used as texture for display of an object. For example, in the case where there is an object, which corresponds to an electronic bulletin board 411, of objects to be displayed on a frame 401, an image of any scene may be displayed on a screen of the object corresponding to the electronic bulletin board 411. An image to be displayed on a screen of the electronic bulletin board 411 may also dynamically change to correspond to a change in a frame.

As in the above description, in FIG. 4B a scene of a moving vehicle may be rendered on a frame 402. Since an external environment of the vehicle is shown in side mirrors 412 of the vehicle, the images to be displayed on the side mirrors 412 may also dynamically change to correspond to a frame change.

In the case where a separate object, in which a dynamic image will be displayed, is present in any frame, a dynamic texture described in this embodiment may refer to texture that is to be textured at the object. Meanwhile, in this embodiment, an object onto which a dynamic texture will be mapped (or textured) may be referred to as a "target object".

Figure 5A:
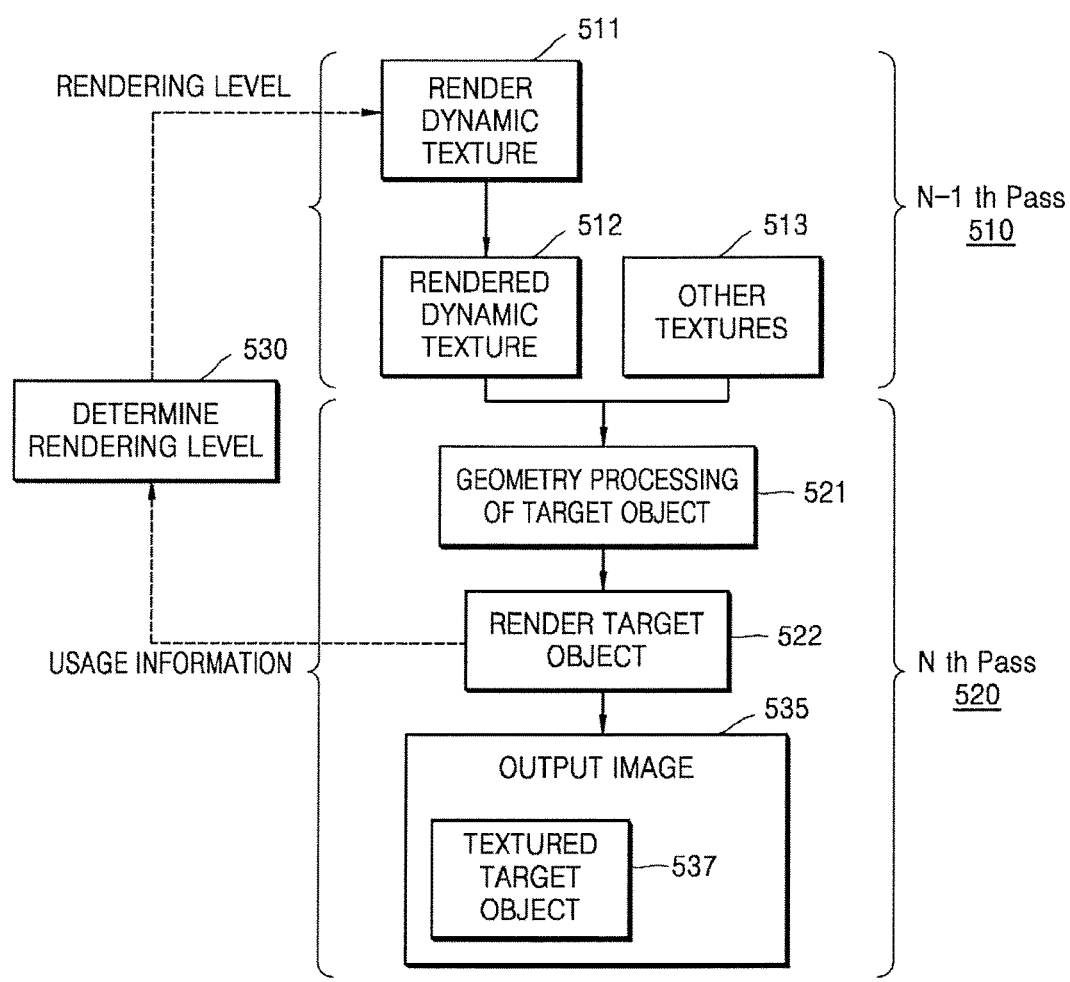
FIG. 5A is an image illustrating the graphics pipeline for rendering a dynamic texture to texture a target object, according to an embodiment of the inventive concept.

FIG. 5A is a diagram illustrating a graphics pipeline for rendering a dynamic texture to texture the target object, according to an embodiment of the inventive concept.

Referring to FIG. 5A, the graphics pipeline 100 may include a (N−1)-th pass (hereinafter referred to as a "first pass") 510 for rendering a dynamic texture and an N-th pass (e.g., referred to as a "second pass") 520 for rendering a target object by using the rendered dynamic texture. Meanwhile, the first pass 510 may be an initial pass of the graphics pipeline 100 or may not be the initial pass. The (N−1)-th pass 510 and the N-th pass 520 may be independent passes, and detailed stages included in the (N−1)-th pass 510 and the N-th pass 520 may be performed in parallel or sequentially by the at least one processor 11.

While the (N−1)-th pass 510 is being performed, at (511) the processor 11 performs geometry processing on a dynamic texture to be mapped onto a target object and renders the dynamic texture. In addition, other textures 513 as well as the rendered dynamic texture 512 may be rendered together in the (N−1)-th pass 510.

With continued reference to FIG. 5A, the processor 11 performs geometry processing 521 on the target object while the N-th pass 520 is performed. Here, the geometry processing 521 of the target object may include vertex shading, primitive assembly, etc. that will be performed on the target object. In addition, the geometry processing 521 may further include performing partial pixel shading of the target object. Afterwards, the processor 11 renders the target object by texturing the target object with the rendered dynamic texture 512. The rendering 522 may include the pixel shading. When the N-th pass 520 is completed, an output image 535 including the textured (e.g., rendered) target object 537 may be created.

The rendering 511 of the dynamic texture in the (N−1)-th pass 510 may be performed in accordance with a rendering level of the dynamic texture, which is based on usage information of the target object obtained by performing the geometry processing 521 of the target object in the N-th pass 520. The usage information may be fed back to the (N−1)-th pass 510. Here, the usage information may include geometry information about a location, a size, or a display range of the target object to be displayed in a current frame. However, the usage information may not be limited to the aforementioned discussion. For example, any other information may be also included in the usage information if the other information is capable of being obtained through the geometry processing 521 of the target object and indicates how the target object is displayed and used in the current frame.

In detail, the processor 11 first performs the geometry processing 521 of the N-th pass 520 before the rendering 511 of the dynamic texture is performed in the (N−1)-th pass 510 and obtains the usage information of the target object as the result of the geometry processing 521.

Afterwards, at (530) the processor 11 determines a rendering level of the dynamic texture based on the usage information of the target object. The rendering level may indicate quality of the dynamic texture, a rendering range of the dynamic texture, whether to use the dynamic texture, etc. The quality of the dynamic texture refers to a size, a resolution, etc. of the dynamic texture, and the rendering range of the dynamic texture refers to whether all or part of the dynamic texture is rendered. Whether to use the dynamic texture refers to determining whether or not the rendering of dynamic texture should be performed to display an image. If the rendering level of the dynamic texture is determined (530), the processor 11 performs the rendering 511 of the dynamic texture in the (N−1)-th pass 510 based on the determined rendering level. For example, the quality (resolution and size) of the rendered dynamic texture 512 may be adjusted, or the rendered dynamic texture 512 may correspond to a portion of a dynamic image. Meanwhile, if the rendering level indicates that the dynamic texture is not used, the processor 11 may skip the rendering 511 of the dynamic texture in the (N−1)-th pass 510.

Accordingly, in the rendered dynamic texture 512, when compared with an original dynamic image, quality may decrease (i.e., a size or a resolution decreases) or partial rendering may be performed, and thus, rendering throughput of the processor 11 may decrease, compared with when the original dynamic image is rendered to the dynamic texture without modification. Alternatively, since the processor 11 skips the rendering 511 of the dynamic texture and the rendering 522 of the target object when the dynamic texture is not desired, rendering throughput may also decrease. In other words, since the throughput of the processor 11 decreases and a memory access frequency also decreases, the GPU 10 may process the graphics pipeline 100 with more efficient performance.

Meanwhile, as described above, the graphics pipeline 100 may be for the tile-based rendering TBR or may be for the immediate rendering IMR.

A graphics pipeline for the TBR may be divided into a tile binning pipeline for determining a primitive included in each tile and a rendering pipeline for performing rendering per tile based on the tile binning result after the tile binning pipeline is completed, as well known. For example, the graphics pipeline for the TBR may be considered as a deferred rendering. In the case where the graphics pipeline 100 according to this embodiment is for the TBR, usage information of a target object, which is obtained by performing the geometry processing 521 of the target object in the N-th pass 520, may be obtained from a result of the tile binning that is performed on the target object. For example, the tile binning result may be, but is not limited thereto, a bit stream in which whether any primitive is included in each tile is expressed by bits.

Figure 5B:
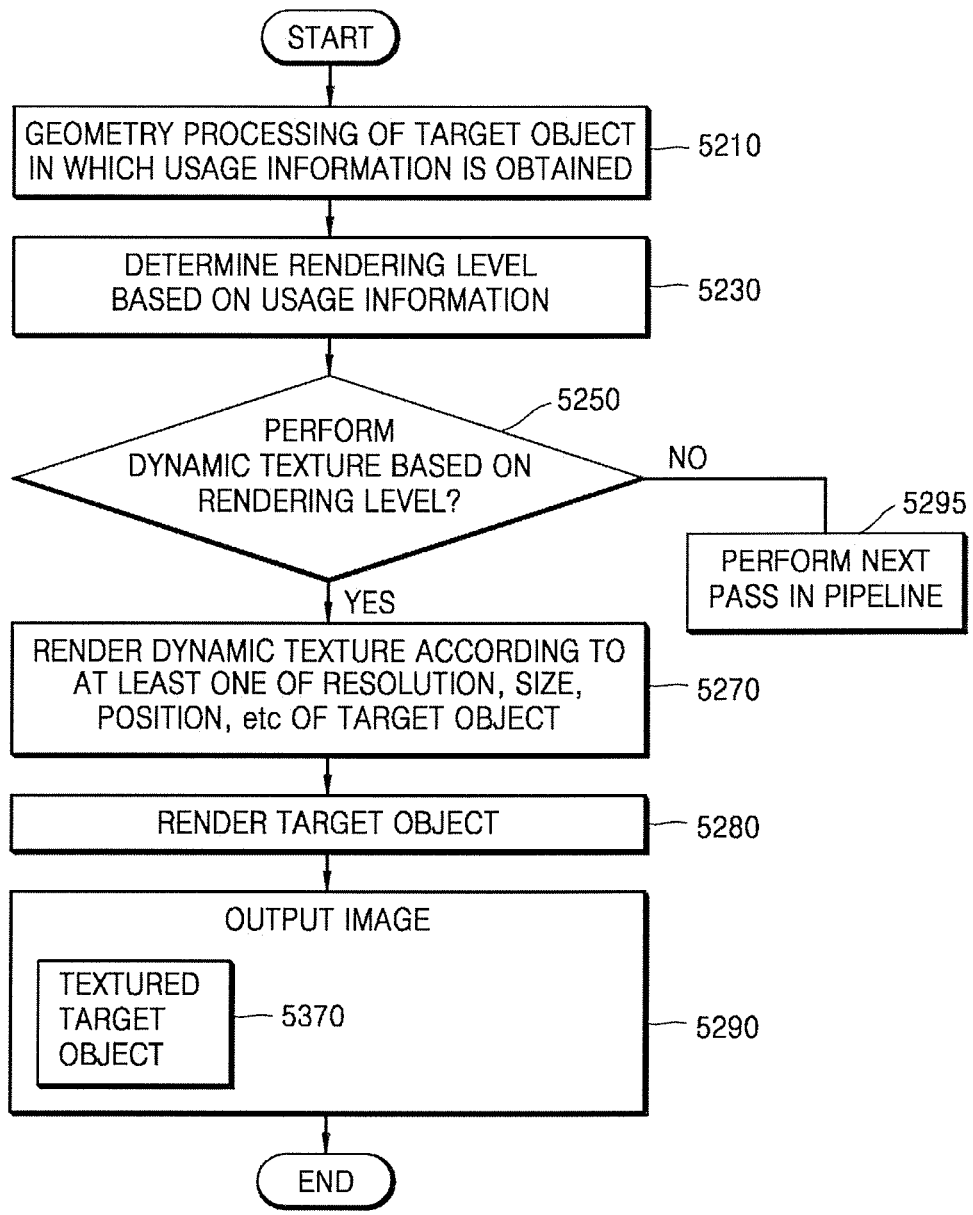
FIG. 5B provides additional detail regarding the pipeline operation illustrated in FIG. 5A.

FIG. 5B provides additional detail regarding the pipeline operation illustrated in FIG. 5A.

With reference to FIG. 5B, at 5210, geometry processing of the target object is performed. As a result, usage information regarding the target object may be obtained. As discussed herein above, the geometry information may include information about a location, a size, or a display range of the target object to be displayed in a current frame. In addition, other information may be also included in the usage information if the other information indicates how the target object is displayed and used in the current frame.

At 5230, the rendering level may be determined based on the usage information. The rendering level may be based on a resolution and size of the dynamic texture of the target object, as well as information indicating whether the dynamic texture should correspond to a portion of an object rather than the entire object depending on its location within a frame. In addition, if the target object is not in a current frame. the rendering level may indicate to skip the rendering of the dynamic texture and the rendering of a target object with dynamic texture.

With continued reference to FIG. 5B, at 5250, a determination is made as to whether or not to perform dynamic texture based on the rendering level. If the rendering level indicates "Yes", there is a rendering of dynamic texture of the target object.

At 5280, the target object is rendering, for example, the texture is wrapped on the target object, and in 5290, there is an output image including the textured target object. Thus, the target object can be displayed with surface texture and/or color.

Referring to FIG. 5B, if at operation 5250 it was determined that a dynamic texture operation was not to be performed, operations 5270 and 5280 can be skipped, and at operation 5295, the next pipeline pass for other operations may be performed.

In the case where the graphics pipeline 100 according to this embodiment is a pipeline for the immediate rendering IMR, the usage information may be obtained from a result of a geometry processing stage associated with the target object, and a geometry processing stage of the IMR may include a vertex shading stage and a primitive assembly stage. Alternatively, the geometry processing stage of the IMR may further include some processes of a pixel shading stage.

According to this embodiment of the inventive concept, if usage information of a target object may be obtained while the graphics pipeline 100 is being performed, various detailed stages may be included in the geometry processing without being limited to the above description.

Figure 6:
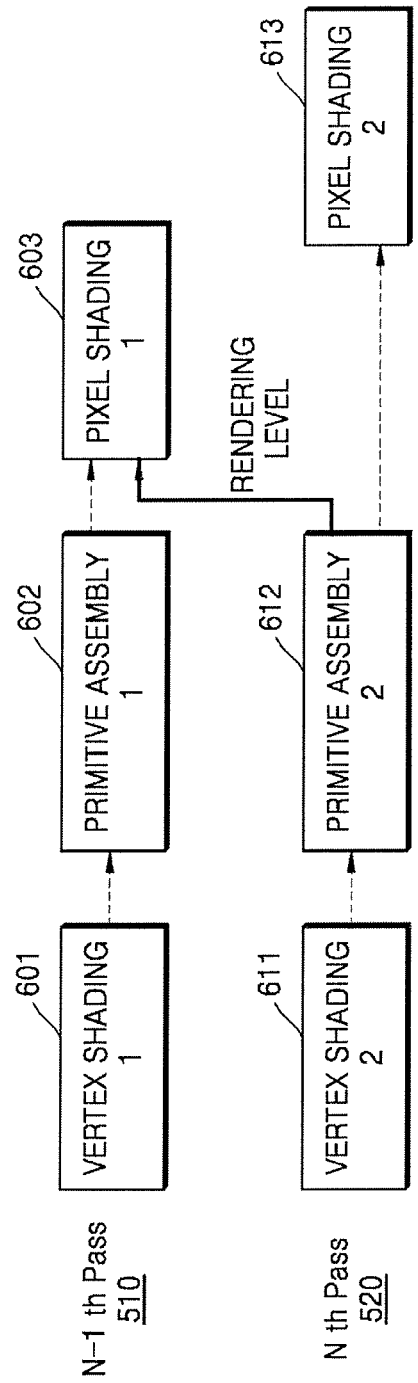
FIG. 6 is a diagram illustrating the graphics pipeline for rendering the dynamic texture to texture the target object, according to an embodiment of the inventive concept.

FIG. 6 is a diagram illustrating a graphics pipeline for rendering a dynamic texture to texture a target object, according to an embodiment of the inventive concept.

Referring now to FIG. 6, the (N−1)-th pass 510 and the N-th pass 520 may correspond to passes described in FIG. 5, respectively.

The (N−1)-th pass (first pass) 510 of the graphics pipeline for rendering a dynamic texture may include a first vertex shading stage 601, a first primitive assembly stage 602, and a first pixel shading stage 603. The N-th pass (second pass) 520 of the graphics pipeline for rendering a target object may include a second vertex shading stage 611, a second primitive assembly stage 612, and a second pixel shading stage 613. For ease of description, some of the stages of the graphics pipeline 100 are illustrated in FIG. 6, and the graphics pipeline 100 may further include general other stages that are not shown.

In FIG. 6, the first vertex shading stage 601 and the first primitive assembly stage 602 may be stages performed for geometry processing of a dynamic texture. Independently of the (N−1)-th pass 510, the GPU 10 obtains usage information of a target object from the second vertex shading stage 611 and the second primitive assembly stage 612 of the N-th pass 520 and determines a rendering level based on the obtained usage information. In FIG. 6, the second vertex shading stage 611 and the second primitive assembly stage 612 may be stages for geometry processing of the target texture.

The first pixel shading stage 603 renders the dynamic texture based on the rendering level that is determined based on the usage information obtained by execution of the geometry processing of the target object, which includes the second vertex shading stage 611 and the second primitive assembly stage 612. If the rendered dynamic texture is created, the second pixel shading stage 613 renders the target object by texturing the target object with the rendered dynamic texture.

Figure 7:
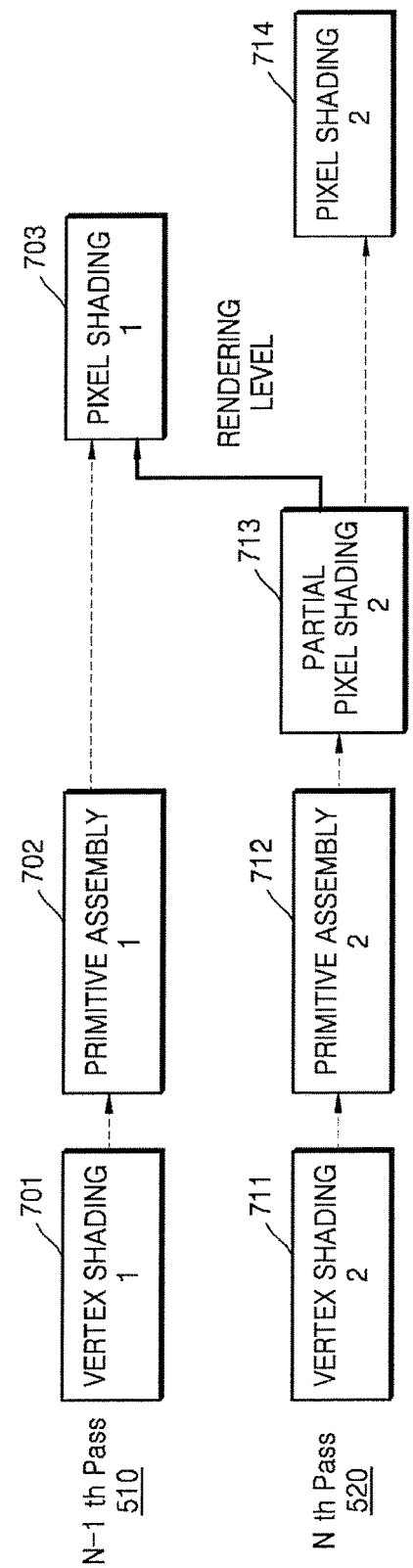
FIG. 7 is a diagram illustrating the graphics pipeline for rendering the dynamic texture to texture the target object, according to an embodiment of the inventive concept.

FIG. 7 is a diagram illustrating a graphics pipeline for rendering a dynamic texture to texture a target object, according to an embodiment of the inventive concept.

Referring to FIG. 7, the (N−1)-th pass 510 and the N-th pass 520 may correspond to passes described in FIGS. 5 and 6, respectively.

Similar to FIG. 6, the (N−1)-th pass (first pass) 510 of the graphics pipeline 100 for rendering a dynamic texture may include a first vertex shading stage 701, a first primitive assembly stage 702, and a first pixel shading stage 703. The N-th pass (second pass) 520 of the graphics pipeline 100 for rendering a target object may include a second vertex shading stage 711, a second primitive assembly stage 712, a partial second pixel shading stage 713, and a remaining second pixel shading stage 714. For ease of description, some of stages of the graphics pipeline 100 are illustrated in FIG. 7, and the graphics pipeline 100 may further include general other stages that are not illustrated in FIG. 7.

In FIG. 7, the first vertex shading stage 701 and the first primitive assembly stage 702 may be stages for geometry processing of a dynamic texture. Independently of the (N−1)-th pass 510, the GPU 10 obtains usage information of a target object from the second vertex shading stage 711, and the second primitive assembly stage 712, and the partial second pixel shading stage 713 of the N-th pass 520 and determines a rendering level based on the obtained usage information. Meanwhile, the partial second pixel shading stage 713 may refer to a process, which is for obtaining usage information indicating whether texturing on the whole target object is recommended, or performing texturing on a portion of the target object is recommended, of the whole pixel shading process. In FIG. 7, the second vertex shading stage 711, the second primitive assembly stage 712, and the partial second pixel shading stage 713 may be stages for geometry processing of the target texture. For example, stages included in the geometry processing of the target object may change or may not be fixed or limited only to any one case.

The first pixel shading stage 703 renders the dynamic texture based on a rendering level that is determined based on the usage information obtained by execution of the geometry processing of the target object, which includes the second vertex shading stage 711, the second primitive assembly stage 712, and the partial second pixel shading stage 713. If the rendered dynamic texture is created, the remaining second pixel shading stage 714 renders the target object by texturing the target object with the rendered dynamic texture.

Meanwhile, according to the operations shown in FIG. 6 or 7, if a result of the geometry processing 611 and 612 of the target object described in FIG. 6 or a result of the geometry processing 711, 712, and 713 of the target object described in FIG. 7 indicates that usage information of the target object not to be displayed in a current frame is obtained, the first pixel shading stage 603 of FIG. 6 or the remaining second pixel shading stage 714 may not be performed (or may be skipped).

Figure 8:
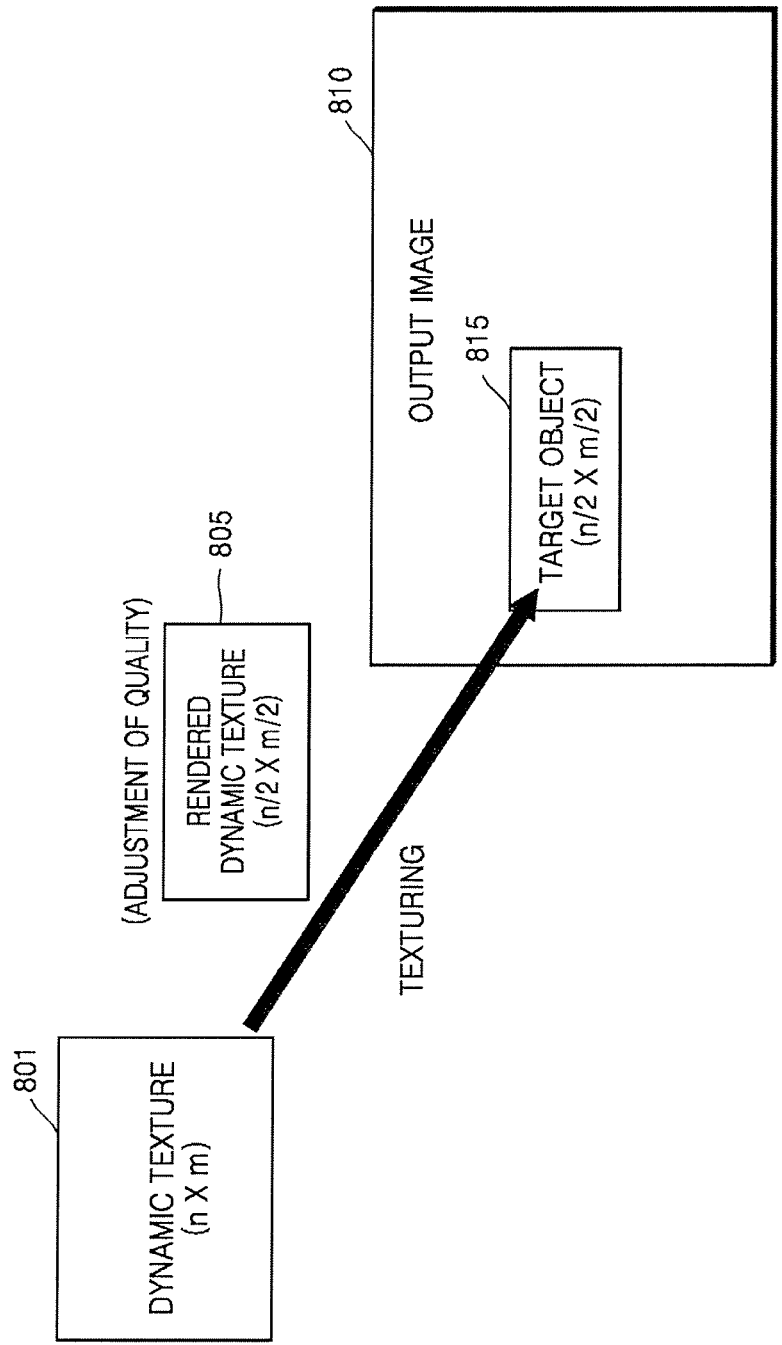
FIG. 8 is a diagram illustrating an operation of performing texturing by using the dynamic texture, of which quality is adjusted based on a rendering level, according to an embodiment of the inventive concept.

FIG. 8 is a diagram illustrating an operation of performing texturing by using a dynamic texture, of which quality is adjusted based on a rendering level, according to an embodiment.

If it is determined based on usage information of a target object 815 that a size of the target object 815 is reduced, the processor 11 may determine the rendering level such that quality of a dynamic texture 801 decreases.

Referring to FIG. 8, the dynamic texture 801 of an n-by-m size indicates texture that is regardless of a rendering level, which is based on usage information of the target object 815, and corresponds to an original dynamic image. If a result of geometry processing of the target object 815 indicates that a size of the target object 815 is (n/2×m/2) different from that of the dynamic texture 801, the processor 11 adjusts the quality of the dynamic texture 801. In detail, the processor 11 decreases the quality (i.e., resolution or sampling level) of the dynamic texture 801 to generate a rendered dynamic texture 805 of the size of (n/2×m/2). Unlike the dynamic texture 801, in the case where the target object 815 is displayed on an output image 810 of a current frame to be relatively small, a user fails to perceive the target object 815 markedly even though a texture quality of the target object 815 decreases. For example, even though the texture quality of the target object 815 decreases, the whole rendering quality of the output image 810 may not substantially decrease so as to be noticeable by a user, but the throughput of the processor 11 may decrease in terms of rendering of the dynamic texture 801 and rendering of the target object 815.

Figure 9:
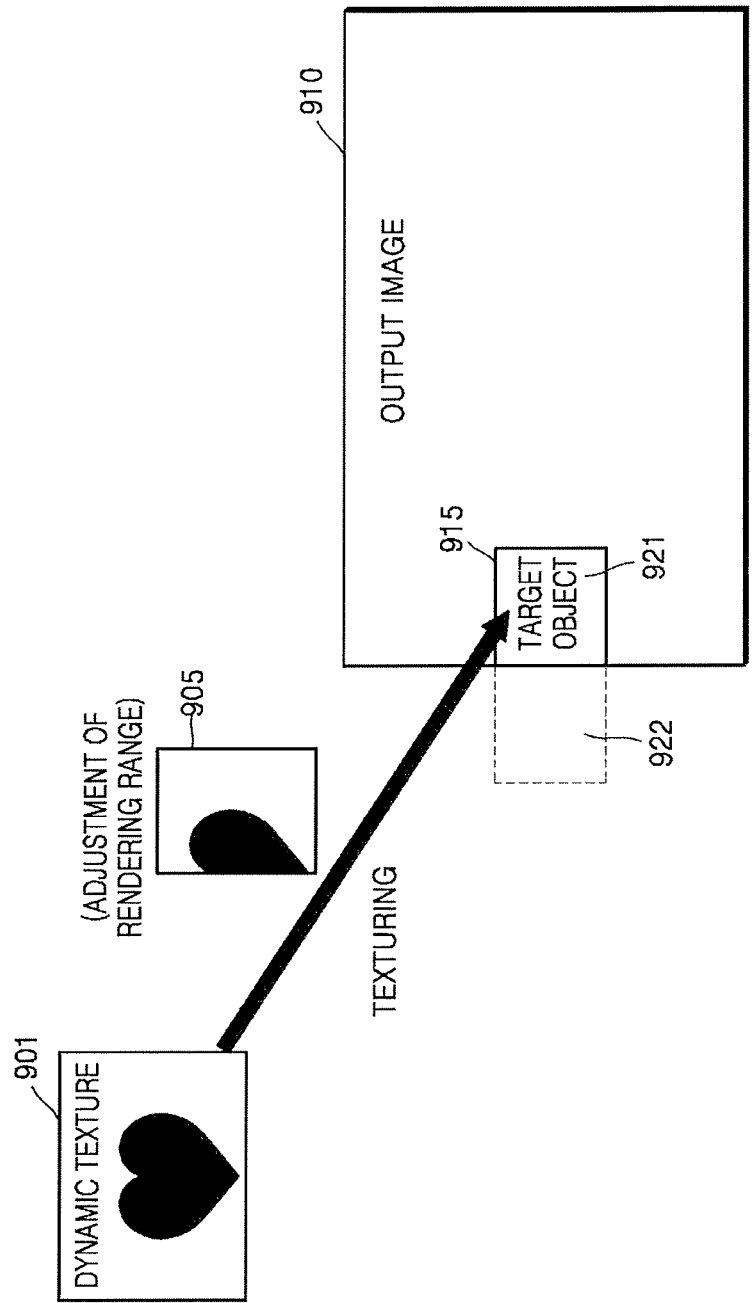
FIG. 9 is a diagram illustrating an operation of performing texturing by using the dynamic texture, in which a portion of the dynamic image is rendered based on a rendering level, according to an embodiment of the inventive concept.

FIG. 9 is a diagram illustrating an operation of performing texturing by using a dynamic texture, in which a portion of a dynamic image is rendered based on a rendering level, according to an embodiment of the inventive concept.

If it is determined based on usage information of a target object 915 that a portion of the target object 915 is displayed in an output image 910 of a current frame and the remaining portion 922 is not displayed, the processor 11 may determine a rendering level such that a portion of a dynamic texture corresponding to the portion 921 of the target object 915 corresponds to a rendering range.

Referring to FIG. 9, a dynamic texture 901 indicates a texture that is, regardless of a rendering level, based on usage information of the target object 915. The dynamic texture corresponds to an original dynamic image. If a result of geometry processing of the target object 915 indicates that only the portion 921 is displayed in the output image 910 of the current frame (unlike the dynamic texture 901), the processor 11 renders a portion of the dynamic texture 901 and creates the rendered dynamic texture 905. Overhead of the processor 11 may decrease in terms of rendering of the dynamic texture 901 and rendering of the target object 915 by rendering, for example, only the portion of the dynamic texture 901, to be displayed for a particular image, rather than rendering the whole dynamic texture 901.

Figure 10:
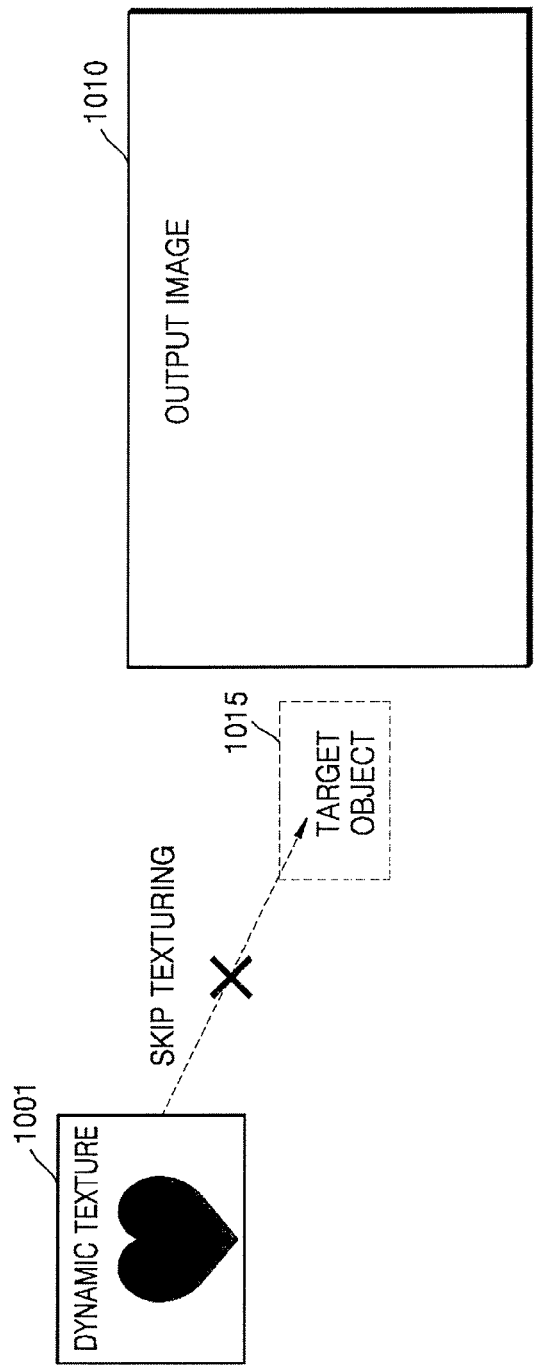
FIG. 10 is a diagram illustrating an operation of skipping rendering of the dynamic texture and rendering of the target object based on a rendering level, according to an embodiment of the inventive concept.

FIG. 10 is a diagram illustrating an operation of skipping rendering of a dynamic texture and rendering of a target object based on a rendering level, according to an embodiment of the inventive concept.

If it is determined, based on usage information of a target object 1015, that the target object 1015 is not displayed in an output image 1010 of a current frame, the processor 11 determines a rendering level such that the dynamic texture 1001 is not used. Accordingly, the processor 11 may skip rendering of the dynamic texture 1001 and rendering of the target object 1015. This may reduce the overhead of the processor 11.

Figure 11:
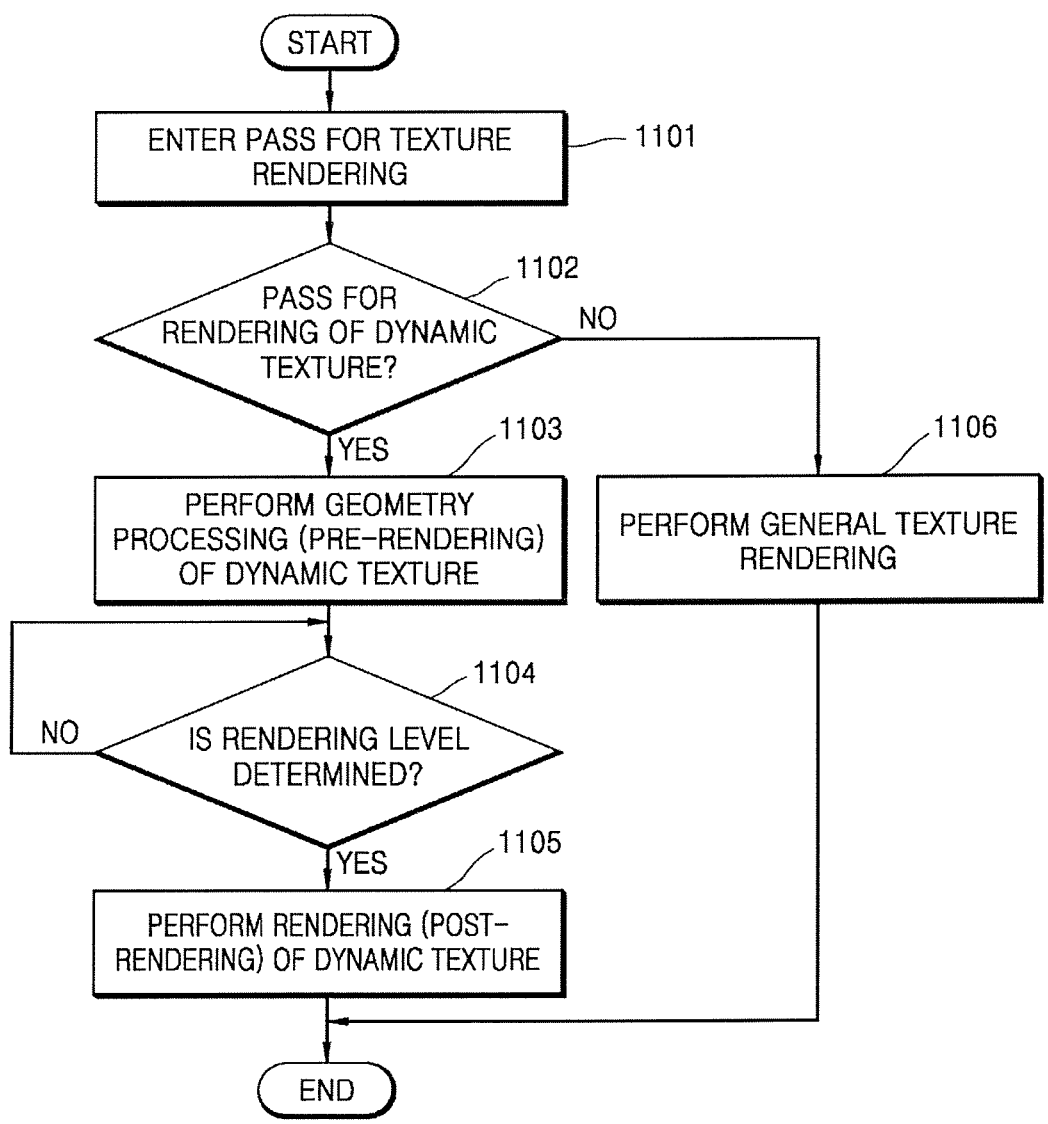
FIG. 11 is a flowchart illustrating a pass for rendering the dynamic texture, according to an embodiment of the inventive concept.

FIG. 11 is a flowchart illustrating a pass for rendering a dynamic texture, according to an embodiment of the inventive concept.

Referring to FIG. 11, a pass for rendering a dynamic texture may correspond to, for example, the (N−1)-th pass (first pass) 510 described with reference to FIG. 5.

In operation 1101, the processor 11 enters a pass for texture rendering. In addition, at operation 1101, the texture rending may be, for example, a pass for rendering dynamic texture, or a pass for performing general texture rendering. Accordingly, a determination is made regarding the type of rendering to be performed.

In operation 1102, the processor 11 determines whether the currently entered pass comprises a pass for the rendering of the dynamic texture, or a pass for general texture rendering. One way such a determination may be made is based on the usage information. For example, the usage information may contain information as to whether there is a dynamic image in a frame. Another way such a determination may be made can be based on the rendering level of dynamic texture. If the processor 11 determines that currently entered pass is the pass for the rendering of the dynamic texture, the processor 11 performs operation 1103. However, if processor 11 determines that the currently entered pass is not the pass for the rendering of the dynamic texture, the processor 11 performs operation 1106.

In operation 1103 performs geometry processing (or pre-rendering) of the dynamic texture.

In operation 1104, the processor 11 determines whether a rendering level is determined through any other pass (e.g., the N-th pass (second pass) 520 of FIG. 5) for the rendering of the target object, which is independent of the currently entered pass. If it is determined that the rendering level is determined, the processor 11 performs operation 1105. If it is determined that the rendering level is not determined, the processor 11 repeats operation 1104 until the rendering level is determined.

In operation 1105, the processor 11 performs rendering (or post-rendering) of the dynamic texture based on the determined rendering level. The rendering of operation 1105 may indicate pixel shading of the dynamic texture.

However, if the currently entered pass is not the pass for the rendering of the dynamic texture, in operation 1106, the processor 11 performs general texture rendering without a rendering level, instead of texture rendering using a rendering level.

Figure 12:
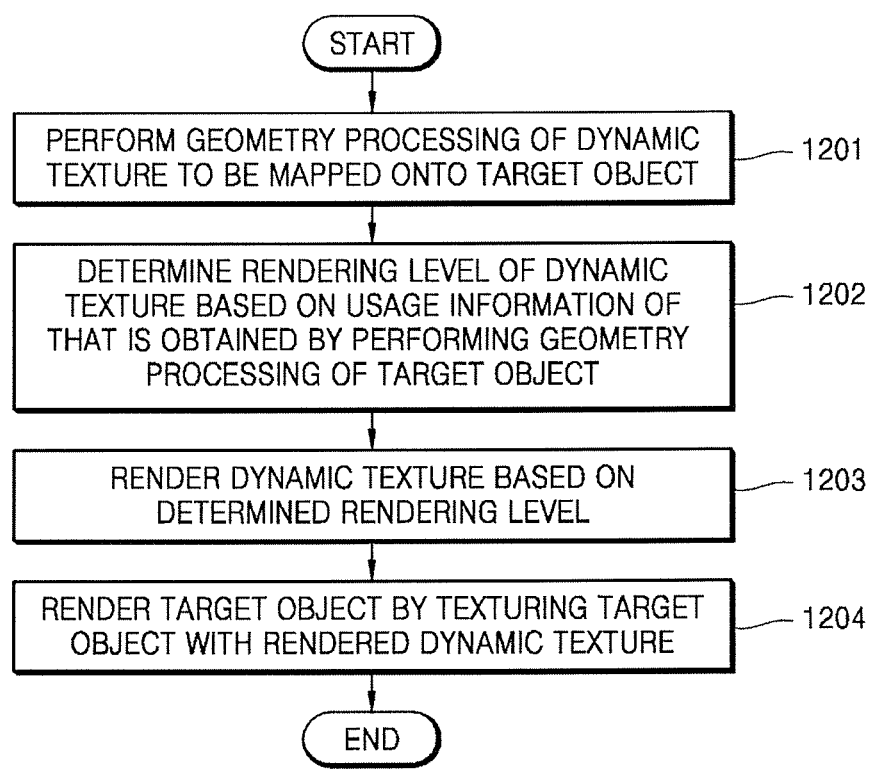
FIG. 12 is a flowchart illustrating a method of processing the graphics pipeline, according to an embodiment of the inventive concept.

FIG. 12 is a flowchart illustrating a method of processing a graphics pipeline, according to an embodiment of the inventive concept. Referring to FIG. 12, since a texture processing method includes processes that are performed in time series in the above-described computing device 1 (GPU 10), even though a description is omitted below, the above description of the computing device 1 (GPU 10) may be applied to the texture processing method of FIG. 12.

In operation 1201, the processor 11 performs geometry processing of a dynamic texture to be mapped onto a target object.

In operation 1202, the processor 11 determines a rendering level of the dynamic texture based on usage information of the target object that is obtained by performing the geometry processing of the target object.

In operation 1203, the processor 11 renders the dynamic texture based on the determined rendering level.

In operation 1204, the processor 11 renders the target object by texturing the target object with the rendered dynamic texture.

Meanwhile, the above-described embodiments of the inventive concept may be implemented with programs that are executable in a computer and may be implemented in a general-purpose digital computer that operates the programs by using a non-transitory computer-readable recording medium. For example, the above-described embodiments can be implemented in hardware, firmware or via the execution of software or computer code in, for example, a Programmable Logic Device (PLD), an Application-Specific Integrated Circuit (ASIC), a Field-Programmable Gate Array (FPGA), The execution of programs may transform the general-purpose digital computer into a special purpose computer. Also, a structure of data used in the above-described embodiments may be recorded in the non-transitory computer-readable recording medium through various devices. The non-transitory computer-readable recording medium includes a magnetic storage medium (e.g., a ROM, a floppy disk, or a HDD), an optical read medium (e.g., a CD-ROM or a DVD), etc. In the addition, the flowcharts provided herein comprise algorithms for configuring the graphic processing apparatus for operation.

It should be understood that embodiments of the inventive concept described herein should be considered in a descriptive sense only and not for purposes of limitation. Descriptions within each embodiment should typically be considered as available for other embodiments.

While one or more embodiments of the inventive concept have been described with reference to the figures, it will be understood by those of ordinary skill in the art that various changes in form and details may be made therein without departing from the spirit and scope as defined by the following claims.

What is claimed is:

1. A method of processing texture in a graphics pipeline, the method comprising:

determining whether a first pass comprises a pass for a rendering of a dynamic texture;

performing, in the first pass, geometry processing of the dynamic texture to be mapped onto a target object when the first pass is determined as the pass for the rendering of the dynamic texture;

performing, in a second pass, geometry processing of the target object to obtain usage information of the target object;

determining a rendering level of the dynamic texture to be mapped onto the target object based on the usage information of the target object;

rendering, in the second pass, the dynamic texture when the determined rendering level indicates that rendering the dynamic texture is to be performed; and rendering the target object by texturing the target object with the rendered dynamic texture;

wherein the usage information of the target object comprises geometry information about a location, a size, and a display range of the target object to be displayed in a current frame, and wherein the first pass and the second pass are independent rendering passes.

2. The method of claim 1, wherein the rendering level indicates at least one of a quality of the dynamic texture, and a rendering range of the dynamic texture.

3. The method of claim 2, wherein determining the rendering level further comprises:

if it is determined based on the usage information that a size of the target object decreases based on a comparison with a size of an original dynamic image, determining the rendering level such that the quality of the dynamic texture decreases; and if it is determined based on the usage information that a portion of the target object is displayed in a current frame, determining the rendering level such that a portion of the dynamic texture corresponding to the portion of the target object corresponds to the rendering range.

4. The method of claim 2, wherein determining the rendering level comprises:

when the determined rendering level indicates that rendering the dynamic texture is not to be performed based on the usage information, or in response to determining that the target object is not displayed in a current frame, skipping the rendering of the dynamic texture and the rendering of the target object.

5. The method of claim 1, wherein the geometry processing of the target object comprises performing vertex shading and primitive assembly operations on the target object.

6. The method of claim 1, wherein the usage information is obtained from a result of tile binning performed on the target object if the graphics pipeline executed is for tile-based rendering (TBR), wherein the usage information is obtained from a result of a geometry processing stage performed on the target object if the graphics pipeline is executed for immediate rendering (IMR).

7. The method of claim 1, wherein the first pass comprises a first vertex shading stage, a first primitive assembly stage, and a first pixel shading stage for rendering the dynamic texture; and the second pass that comprises a second vertex shading stage, a second primitive assembly stage, and a second pixel shading stage for rendering the target object, and wherein the first pixel shading stage renders the dynamic texture by determining the rendering level based on the usage information obtained by performing the geometry processing including the second vertex shading stage and the second primitive assembly stage.

8. The method of claim 1, wherein the first pass comprises a first vertex shading stage, a first primitive assembly stage, and a first pixel shading stage for rendering the dynamic texture and the second pass that comprises a second vertex shading stage, a second primitive assembly stage, and a second pixel shading stage for rendering the target object, and wherein the first pixel shading stage renders the dynamic texture by determining the rendering level based on the usage information obtained by performing the second vertex shading stage, the second primitive assembly stage, and a partial second vertex shading stage.

9. A graphics processing apparatus that processes texture in a graphics pipeline, the graphics processing apparatus comprising:

at least one cache memory; and at least one processor configured to:

determine whether a first pass comprises a pass for a rendering of a dynamic texture;

perform, in the first pass, geometry processing of a dynamic texture to be mapped onto a target object, when the first pass is determined as the pass for the rendering of the dynamic texture;

perform, in a second pass, geometry processing of the target object to obtain usage information of the target object;

determine a rendering level of the dynamic texture based on the usage information of the target object obtained by the geometry processing of the target object;

render, in the second pass, the dynamic texture based on the determined rendering level; and render the target object by texturing the target object with the rendered dynamic texture.

10. The graphics processing pipeline apparatus of claim 9, wherein the geometry processing of the dynamic texture, the determined rendering level, and a determination by the at least one processor as to whether to use the dynamic texture is performed in a different pipeline pass than a pipeline pass in which the dynamic texture and the target object are rendered.

11. The graphics processing apparatus of claim 9, wherein the rendering level indicates at least one of a quality of the dynamic texture, a rendering range of the dynamic texture, and whether to use the dynamic texture.

12. The graphics processing apparatus of claim 11, wherein the quality of the dynamic texture comprises at least one of a size or a resolution of the dynamic texture.

13. The graphics processing apparatus of claim 11, wherein, if it is determined based on the usage information that a size of the target object decreases, the at least one processor determines the rendering level to decrease the quality of the dynamic texture, wherein, if it is determined based on the usage information that a portion of the target object is displayed in a current frame, the at least one processor determines the rendering level based on a portion of the dynamic texture corresponding to the portion of the target object that corresponds to the rendering range, and wherein, if it is determined based on the usage information that the target object is not displayed in the current frame, the at least one processor determines the rendering level to indicate that the dynamic texture is not used and does not render the dynamic texture and the target object.

14. The graphics processing apparatus of claim 9, wherein the usage information is obtained from a result of tile binning performed on the target object if the graphics pipeline is performed for tile-based rendering (TBR), and
   wherein the usage information is obtained from a result of a geometry processing stage performed on the target object if the graphics pipeline is performed for immediate rendering (IMR).

15. The graphics processing apparatus of claim 9, wherein the at least one processor is configured to process the graphics pipeline by performance of a first pass that comprises a first vertex shading stage, a first primitive assembly stage, and a first pixel shading stage that renders the dynamic texture; and a second pass that comprises a second vertex shading stage, a second primitive assembly stage, and a second pixel shading stage that renders the target object, and
   wherein the first pixel shading stage renders the dynamic texture based on the rendering level that is determined based on the usage information obtained by performance of the geometry processing including the second vertex shading stage and the second primitive assembly stage.

16. The graphics processing apparatus of claim 9, wherein the at least one processor is configured to process the graphics pipeline by performance of a first pass that comprises a first vertex shading stage, a first primitive assembly stage, and a first pixel shading stage that renders the dynamic texture; and a second pass that comprises a second vertex shading stage, a second primitive assembly stage, and a second pixel shading stage that renders the target object, and
   wherein the first pixel shading stage renders the dynamic texture based on the rendering level that is determined based on the usage information obtained by performing the second vertex shading stage, the second primitive assembly stage, and a part of the second vertex shading stage.

17. A method of processing texture in a graphics pipeline, the method comprising:
   identifying a rendering level of a dynamic texture to be mapped onto a target object, wherein the rendering level is based on usage information indicating how the target object is displayed in a first frame;
   determining that the rendering level indicates the dynamic texture is to be rendered during a second frame; and
   rendering the dynamic texture for display in a second frame based on the rendering level.

* * * * *